(12) United States Patent
Miao

(10) Patent No.: US 10,487,580 B2
(45) Date of Patent: Nov. 26, 2019

(54) THICK PLATE TYPE JOINT LOCK FOR LADDER CONNECTION

(71) Applicant: SUZHOU DONGRUN LADDER CO., LTD., Suzhou (CN)

(72) Inventor: Xiaochun Miao, Suzhou (CN)

(73) Assignee: SUZHOU DONGRUN LADDER CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 15/479,076

(22) Filed: Apr. 4, 2017

(65) Prior Publication Data

US 2017/0204663 A1    Jul. 20, 2017

Related U.S. Application Data

(63) Continuation of application No. 14/380,037, filed as application No. PCT/CN2013/083712 on Sep. 18, 2013, now abandoned.

(30) Foreign Application Priority Data

Jan. 18, 2013    (CN) .................... 2013 2 0026646 U

(51) Int. Cl.
*E06C 7/50*    (2006.01)
*E05D 11/10*    (2006.01)
(Continued)

(52) U.S. Cl.
CPC ............ *E06C 7/50* (2013.01); *E05D 11/1007* (2013.01); *E06C 1/32* (2013.01); *F16C 11/10* (2013.01); *Y10T 16/54* (2015.01); *Y10T 16/551* (2015.01)

(58) Field of Classification Search
CPC . E05D 11/10; E05D 11/1007; E05D 11/1014; Y10T 16/54; Y10T 16/5453; Y10T 16/551; E06C 7/50
See application file for complete search history.

(56) References Cited

U.S. PATENT DOCUMENTS 1,205,411 A    11/1916    Thulander et al.
1,337,817 A    4/1920    Rudland
(Continued)

FOREIGN PATENT DOCUMENTS

CN    1397709 A    2/2003
CN    2813867 Y    9/2006
(Continued)

OTHER PUBLICATIONS

International Search Report From PCT/CN2013/083712, dated Dec. 26, 2013.
(Continued)

*Primary Examiner* — Jeffrey O'Brien

(57) ABSTRACT

The utility model provides a thick-plate hinge for ladder jointing, comprising an inner plate and outer plates that are rotatably connected to each other; the thick-plate hinge further comprises a positioning shaft sleeve designed to lock up and position the inner plate and outer plates, the outer plate is provided with a stop stub designed to limit the relative rotation angle of the inner plate, the inner plate is provided with a slot designed to stop the stop stub. Compared to the prior art, when the thick-plate hinge for ladder jointing provided in the utility model is used on a ladder, the ladder will have improved bearing performance, and will be safer and more reliable. In addition, the present utility model is simple in structure, easy to manufacture, and low in cost.

18 Claims, 9 Drawing Sheets

(51) Int. Cl.
*F16C 11/10* (2006.01)
*E06C 1/32* (2006.01)

(56) References Cited

U.S. PATENT DOCUMENTS

| | | | |
|---|---|---|---|
| 3,643,292 | A | 2/1972 | Mayer |
| 3,811,151 | A | 5/1974 | Kuemmerlin |
| 3,849,834 | A | 11/1974 | Mayer |
| 3,879,146 | A | 4/1975 | Mayer |
| 4,027,741 | A | 6/1977 | Derrick |
| 4,152,810 | A | 5/1979 | Martinez |
| 4,157,128 | A | 6/1979 | Peters |
| 4,403,373 | A | 9/1983 | Kummerlin |
| 4,407,045 | A | 10/1983 | Boothe |
| 4,566,150 | A | 1/1986 | Boothe |
| 4,602,889 | A | 7/1986 | Mu-Shan |
| 4,666,328 | A | 5/1987 | Ryu |
| 4,773,503 | A | 9/1988 | Purkapile |
| 5,058,239 | A * | 10/1991 | Lee ............. E06C 1/32 16/324 |
| 5,487,207 | A | 1/1996 | Rey |
| 5,954,157 | A | 9/1999 | Grimes |
| 6,343,406 | B1 | 2/2002 | Yeh |
| 6,353,970 | B1 | 3/2002 | Spaeth |
| 6,397,433 | B1 | 6/2002 | Chen |
| 7,007,344 | B2 | 3/2006 | Lee |
| 7,047,597 | B2 | 5/2006 | Lee |
| 7,140,072 | B2 | 11/2006 | Leng |
| 7,424,933 | B2 | 9/2008 | Weiss |
| 8,123,298 | B2 * | 2/2012 | Chen ............. B60N 2/206 297/378.1 |
| 8,381,873 | B2 | 2/2013 | Cross |
| 8,550,559 | B2 | 10/2013 | Sollars |
| 8,591,444 | B2 | 11/2013 | Bejarno |
| 2003/0012595 | A1 * | 1/2003 | Park ............. E06C 1/32 403/84 |
| 2003/0037412 | A1 | 2/2003 | Lee |
| 2004/0216277 | A1 | 11/2004 | Beaver |
| 2005/0166364 | A1 | 8/2005 | Lee |
| 2005/0252721 | A1 | 11/2005 | Parker et al. |
| 2005/0268434 | A1 | 12/2005 | Burbrink |
| 2007/0067957 | A1 | 3/2007 | Moore |

FOREIGN PATENT DOCUMENTS

| | | |
|---|---|---|
| CN | 201354583 Y | 12/2009 |
| CN | 20381279 U | 7/2013 |
| DE | 3737295 A1 | 5/1989 |
| DE | 202006004076 U1 | 6/2006 |
| KR | 20030064170 A | 7/2003 |
| WO | 1998031906 A1 | 7/1998 |
| WO | 2010086668 A2 | 8/2010 |

OTHER PUBLICATIONS

Written Oppinion From PCT/CN2013/082712, dated Dec. 26, 2013.
Patent Examination Report No. 1 From Australian Patent Application No. 2013373963 dated Jun. 25, 2015.
Response to Examination Report From Australian Patent Application No. 2013373963 dated Sep. 24, 2015.
Notice of Acceptance From Australian Patent Application No. 2013373963 dated Dec. 22, 2015.
Office Action From U.S. Appl. No. 14/380,037 dated Oct. 23, 2015.
Response to Office Action From U.S. Appl. No. 14/380,037 dated Jan. 25, 2016.
Office Action From U.S. Appl. No. 14/380,037 dated Mar. 4, 2016.
Response to Office Action From U.S. Appl. No. 14/380,037 dated Jun. 2, 2016.
Supplemental Response to Office Action From U.S. Appl. No. 14/380,037 dated Jun. 3, 2016.
Office Action From U.S. Appl. No. 14/380,037 dated Jun. 24, 2016.
Response to Office Action From U.S. Appl. No. 14/380,037 dated Nov. 23, 2016.
Office Action From U.S. Appl. No. 14/380,037 dated Jan. 4, 2017.

* cited by examiner (Prior Art) Fig. 4

THICK PLATE TYPE JOINT LOCK FOR LADDER CONNECTION

CROSS-REFERENCE TO RELATED APPLICATION

This application is a Continuation of U.S. application Ser. No. 14/380,037, filed Aug. 20, 2014, which is the U.S. national phase entry of PCT/CN2013/083712, with an international filing date of 18 Sep. 2013, which claims the benefit of Chinese Patent Application No. 201320026646.8, with a filing date of 18 Jan. 2013, the entire disclosures of which are fully incorporated herein by reference.

FIELD OF THE INVENTION

The present invention relates to a structure member for ladder jointing, in particular to a thick-plate hinge for ladder jointing.

BACKGROUND OF THE INVENTION

In 1970s, an American Hal Wing designed and manufactured a telescopic multi-purpose ladder, which was commonly known as "Little Giant". Through years of development, Little Giant ladders have taken the lead in the industry and are popular around the world.

A key technique of Little Giant ladders is the jointing part, called thick plate hinge that joints the upper ladder section and a lower ladder section. Please see FIG. 1-4. The thick-plate hinge 10 comprises an inner plate 11 and outer plates 12 that are folded on outer sides of the inner plate, the inner plate 11 and outer plate 12 are relatively rotatable; the thick-plate hinge 10 further comprises a positioning shaft sleeve 13 designed to lock up and position the inner plate 11 and outer plates 12, wherein, the positioning shaft sleeve 13 has a shaft 14 and a lock pin 15, the outer plate 12 has a stop stub 16 fixed on it, and the stop stub 16 butts against an outer arc surface 110 of the inner plate 11 when the relative rotation angle between the inner plate 11 and the outer plate 12 reaches 180°. The stop stub 16 can improves the bearing performance of the thick-plate hinge 10.

Via the positioning shaft sleeve 13, the inner plate 11 and outer plates 12 of the thick-plate hinge 10 can be locked up when they rotate to a preset angle in relation to each other, for example, the inner plate 11 and outer plates 12 can be locked up via the positioning shaft sleeve 13 when the unfolding angle is 0°, 36°, or 180°. With the structure described above, two thick-plate hinge 10 can be connected between an upper ladder section and a lower ladder section, so that the ladder can be transformed into a double-sided ladder (with 36° unfolding angle) or a long straight ladder (with 180° unfolding angle), to attain multiple purposes.

When the ladder is transformed into a straight ladder, both the inner plate and the outer plate of the two thick-plate hinges are unfolded to 180°. When tested in unexpected state or under specific conditions, e.g., tested as per the ladder standards of USA or that of Australia, the tested ladder must be able to bear the test load in a case that either thick-plate hinge work in fail state (the lock pin 15 is drawn out of the lock pin hole). In the prior art, in case either thick-plate hinge in fail state, though the thick-plate hinge still has some bearing capability obtained from the butting of the stop stub 16 and outer plate 12, the stop stub would have displacement on the outer arc surface, since the bearing surface of the inner plate that butts against the stop stub is arc surface; consequently, the bearing angle between the upper ladder section and the lower ladder section is greater than 180°; in addition, the higher the load is, the greater the displacement would be, and it lead to larger relative rotation angle between the inner plate and the outer plate. As a result, the overall bearing capacity of the ladder would be degrade, and the entire ladder is more possible to fail in the test. In that case, the solution in the prior art is to increase the strength of the thick-plate hinge or the strength of the entire ladder to improve the bearing capacity of the entire ladder, which would inevitably increase the cost of the entire ladder severely.

SUMMARY OF THE INVENTION

To overcome the drawbacks in the prior art, the present invention provides a new thick-plate hinge, which has better bearing performance and is safer and more reliable.

To attain the object described above, the present invention provides a thick-plate hinge for ladder jointing, comprising an inner plate and outer plates that are folded on both outer sides of the inner plate, the inner plate and outer plates are relatively rotatable; the thick-plate hinge further comprises a positioning shaft sleeve that is designed to lock up and position the inner plate and outer plates, and the outer plate has a stop stub fixed on it, wherein, the inner plate has a slot designed to limit the displacement of the stop stub, and the stop stub will enter into the slot partially or entirely when the relative rotation angle between the inner plate and the outer plate reaches 180°.

Preferably, the stop stub is a cylindrical stub, the bottom surface of the slot is an inwardly concaved arc surface, and the arc surface is tangentially fit the outer circumferential surface of the stop stub. More preferably, the radius of the arc surface is greater than or equal to the radius of the stop stub.

Preferably, the depth of the slot is greater than or equal to the radius of the stop stub.

With the technical solution described above, in the thick-plate hinge provided in the present invention, by providing the slot on the inner plate, the slot can limit the displacement of the stop stub when the relative rotation angle between the inner plate and the outer plate reaches to 180°; thus, the thick-plate hinge has better bearing performance, and is safer and more reliable.

DETAILED DESCRIPTION OF THE EMBODIMENTS

Figure 1:
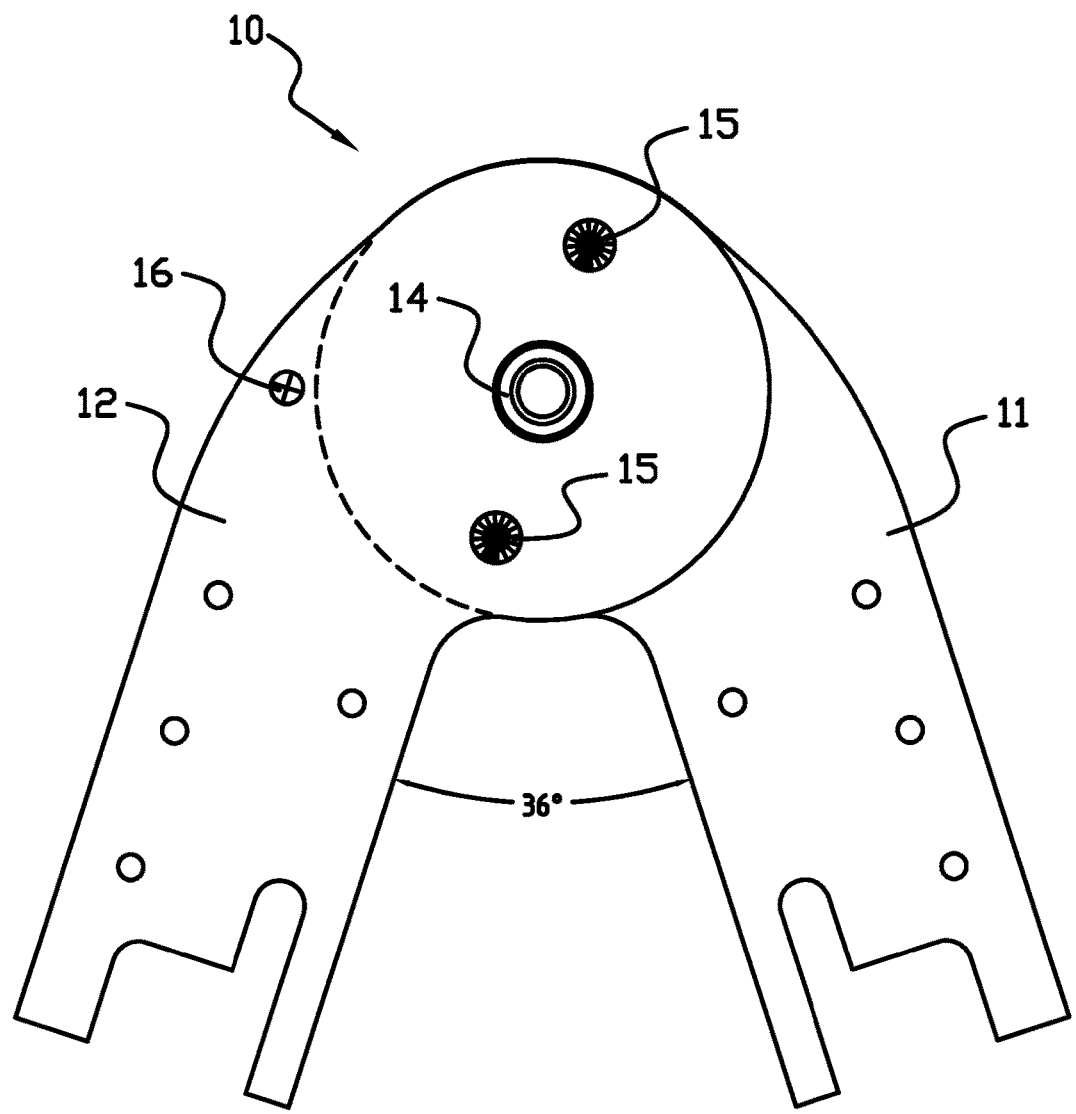
FIG. 1 is a front view of a thick-plate hinge for ladder jointing in the prior art, with the thick-plate hinge unfolded to 36°.
Figure 2:
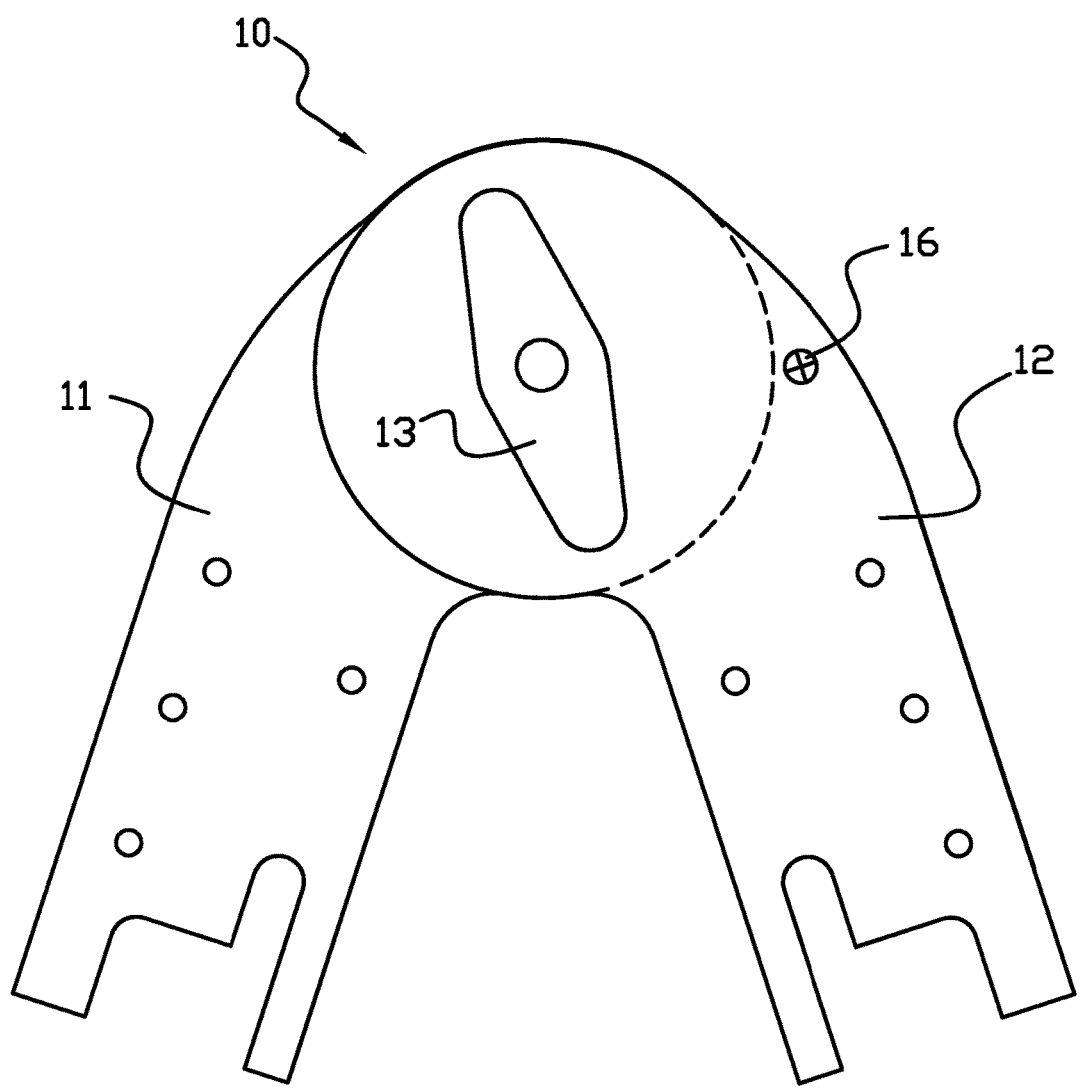
FIG. 2 is a rear view of the thick-plate hinge for ladder jointing in the prior art, with the thick-plate hinge unfolded to 36°.
Figure 3:
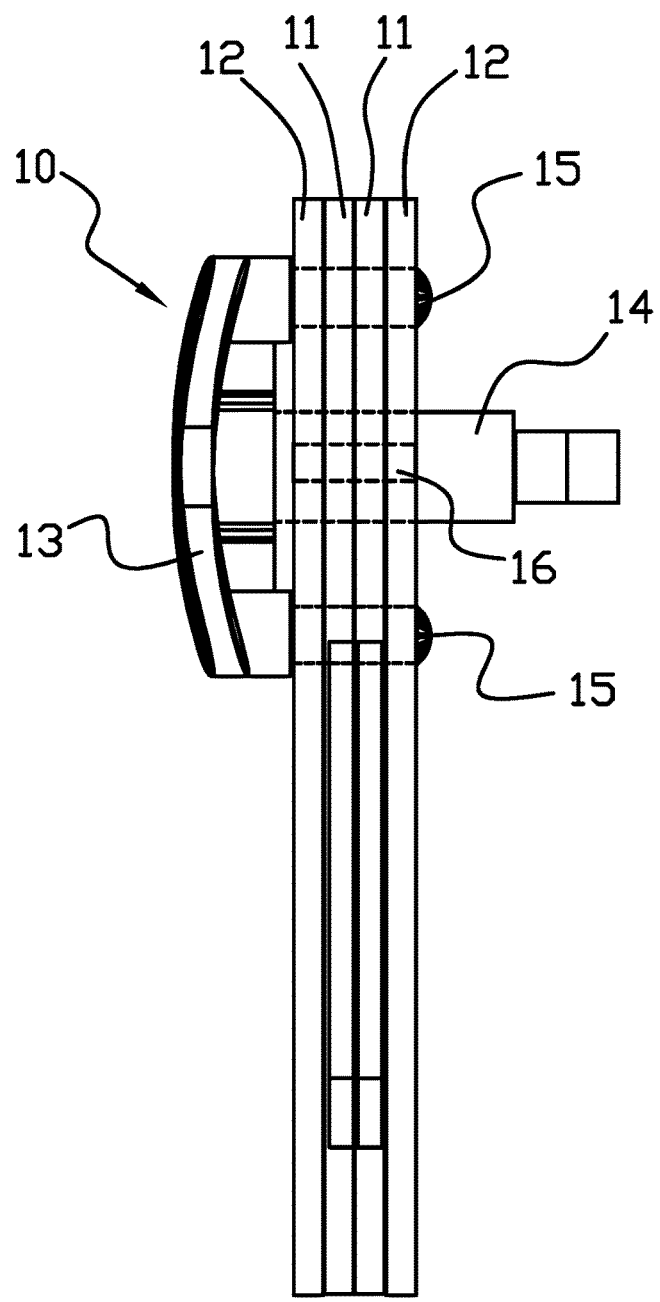
FIG. 3 is a left view of the thick-plate hinge for ladder jointing in the prior art, with the thick-plate hinge unfolded to 36°.
Figure 4:
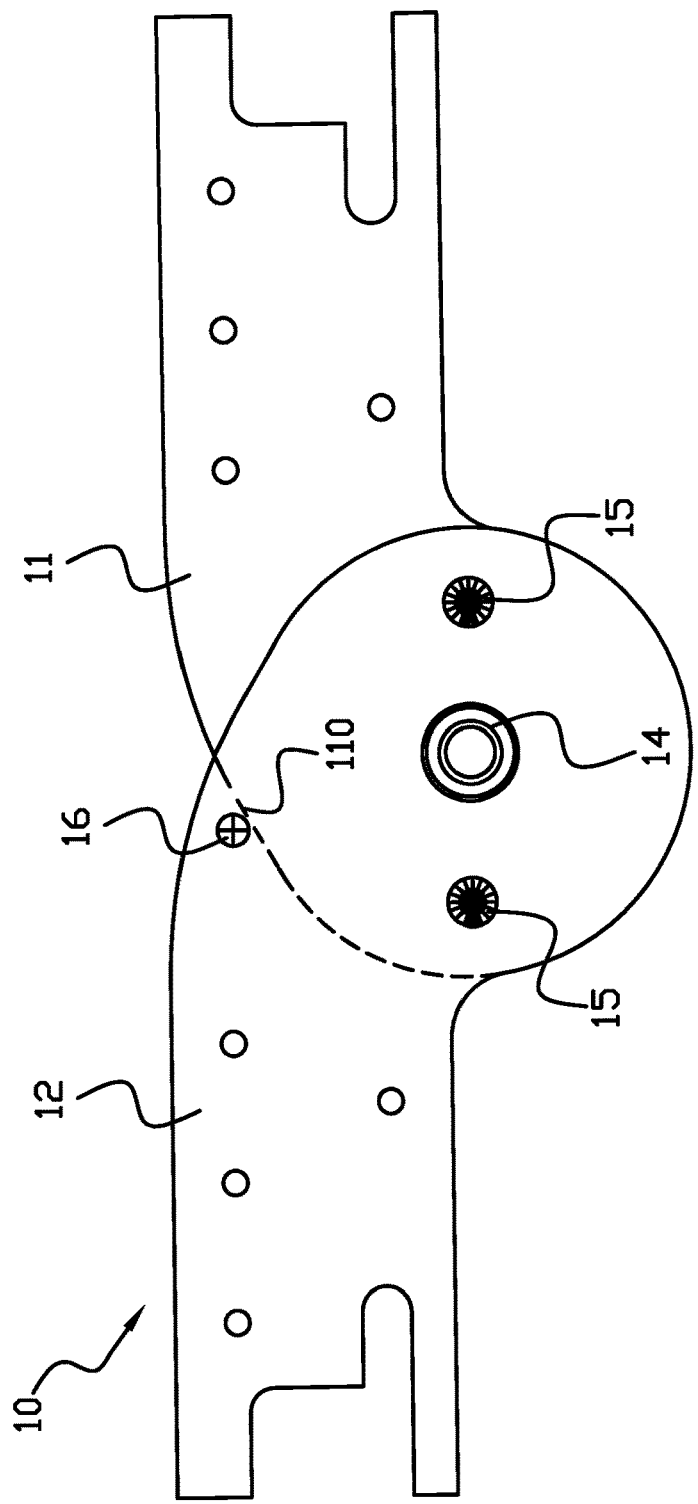
FIG. 4 is a front view of the thick-plate hinge for ladder jointing in the prior art, with the thick-plate hinge unfolded to 180°.
Figure 5:
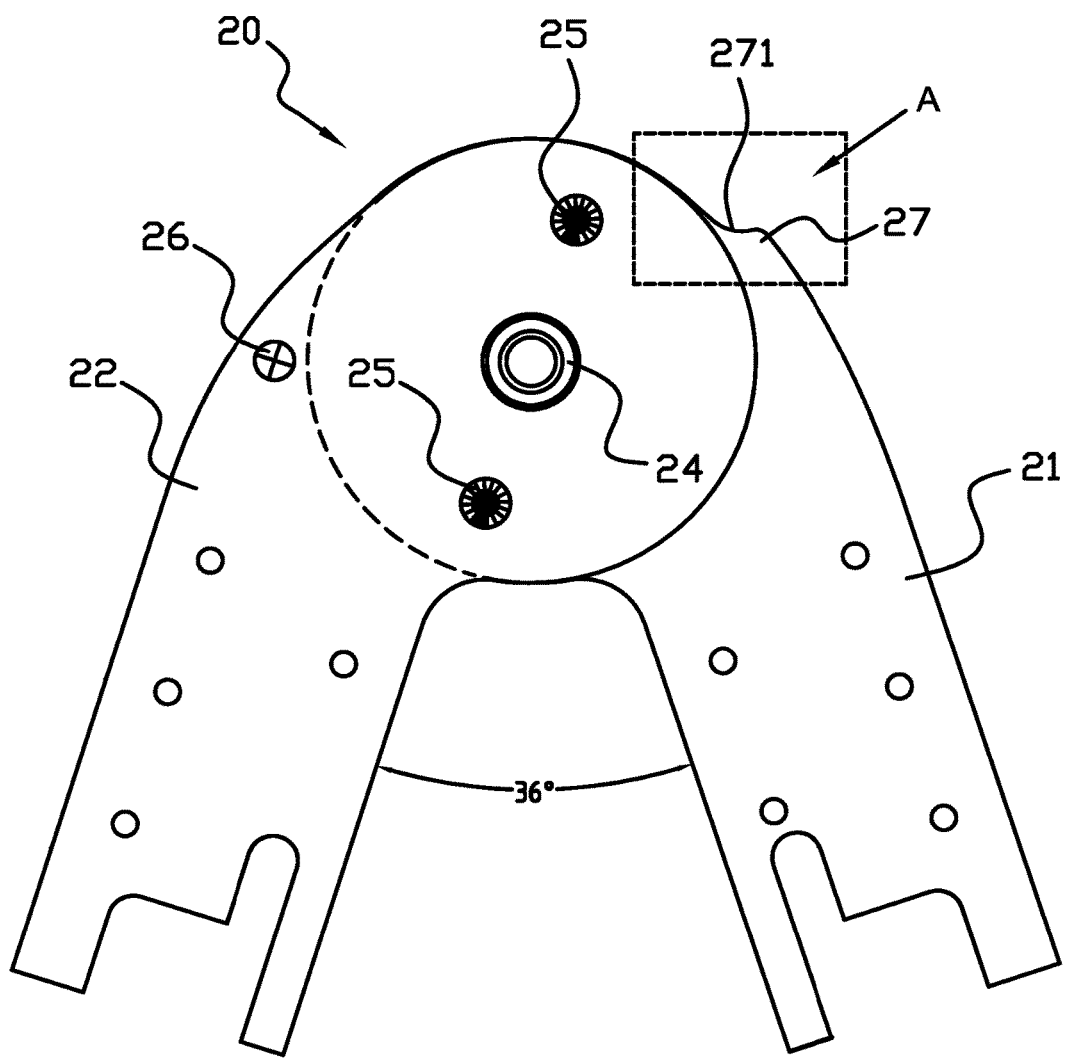
FIG. 5 is a front view of the thick-plate hinge for ladder jointing provided in the present invention, with the thick-plate hinge unfolded to 36°.
Figure 6:
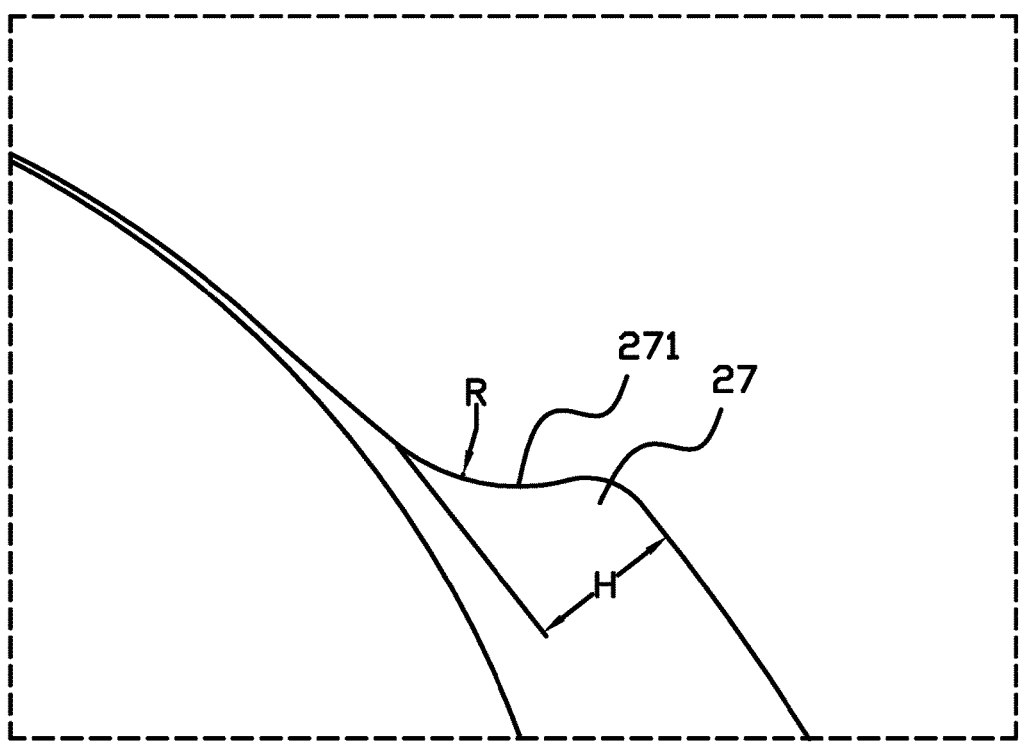
FIG. 6 is an enlarged view of portion A of the thick-plate hinge shown in FIG. 5.
Figure 7:
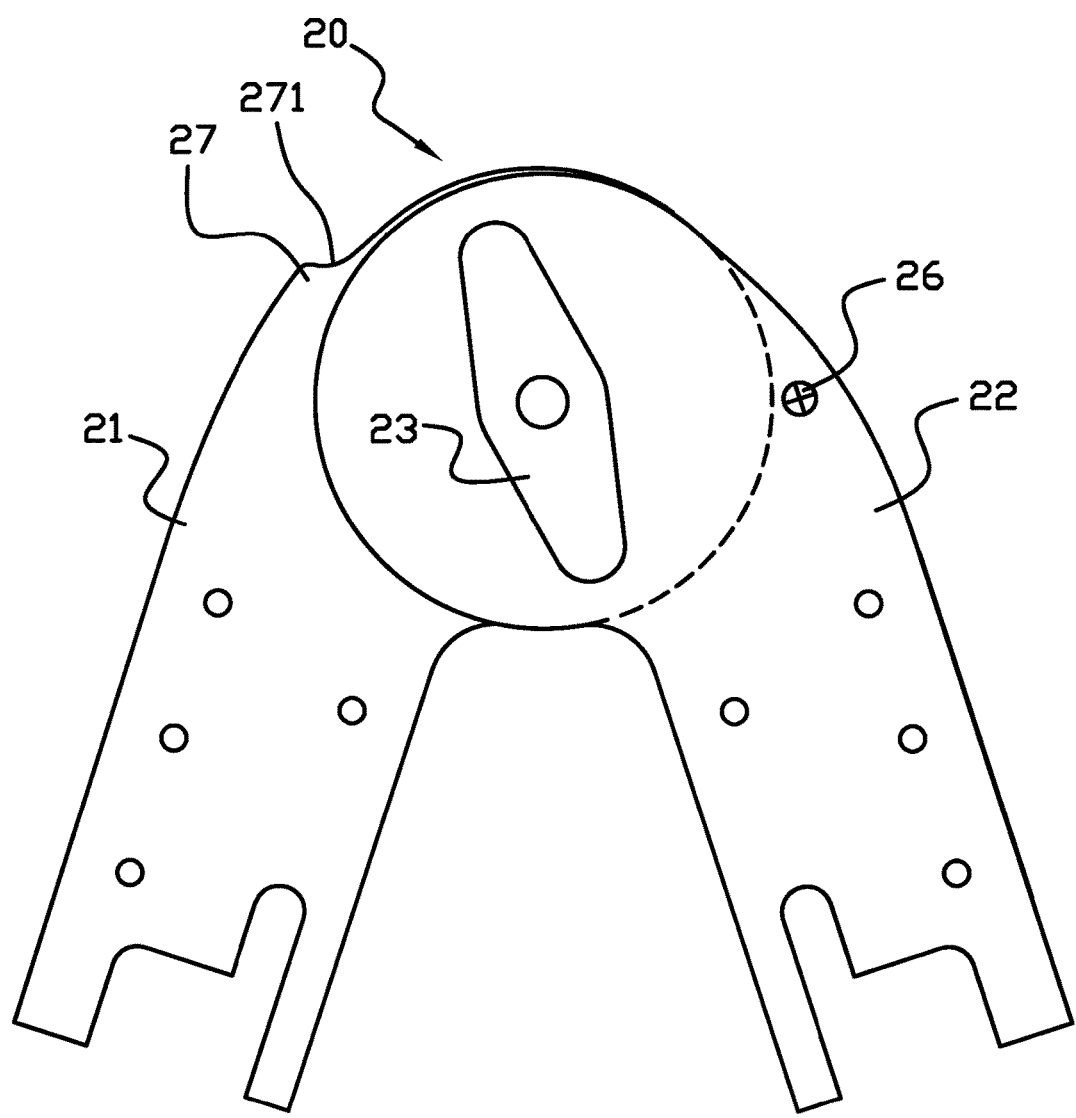
FIG. 7 is a rear view of the thick-plate hinge for ladder jointing provided in the present invention, with the thick-plate hinge unfolded to 36°.

Thereinafter, a preferred embodiment of the present invention will be described in detail, with reference to the accompanying drawings.

Please see FIG. 5-8. The present invention provides a thick-plate hinge 20 for ladder jointing, comprising an inner plate 21 and outer plates 22 that are folded on both outer sides of the inner plate, the inner plate 21 and outer plate 22 are relatively rotatable; the thick-plate joint lock 20 further comprises a positioning shaft sleeve 23 designed to lock up and position the inner plate 21 and outer plates 22, the positioning shaft sleeve 23 is provided with a shaft 24 and a lock pin 25, the outer plate 22 has a stop stub 26 fixed on it, and the inner plate 21 has a slot 27 that limits the displacement of the stop stub 26.

Figure 8:
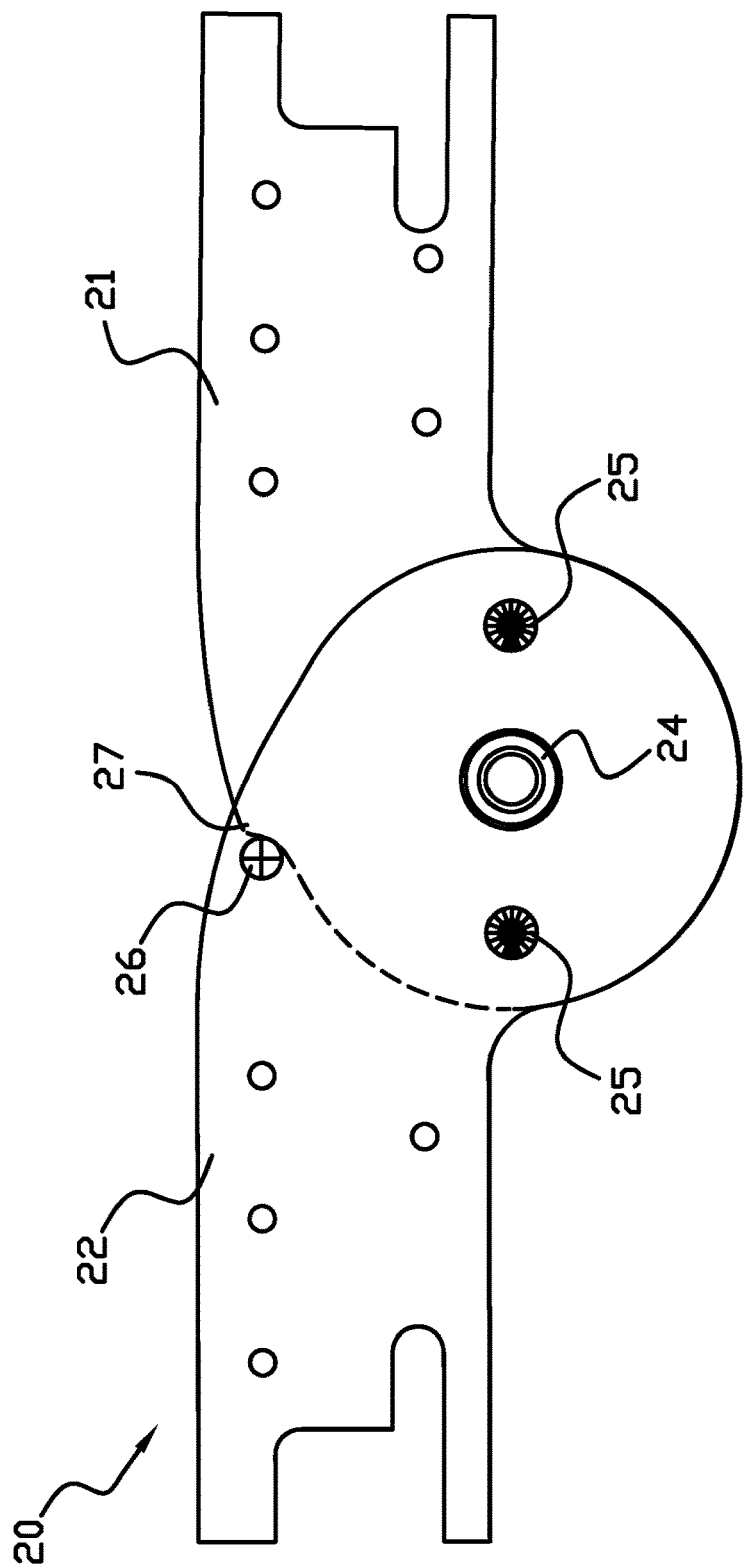
FIG. 8 is a front view of the thick-plate hinge for ladder jointing provided in the present invention, with the thick-plate hinge unfolded to 180°.

Please see FIG. 8. The stop stub 26 will enter into the slot 27 entirely when the relative rotation angle between the inner plate 21 and the outer plate 22 reaches 180°.

In this embodiment, the stop stub 26 is a cylindrical stub, the bottom surface 271 of the slot 27 is an inwardly concaved arc surface, the outer circumferential surface of the stop stub 26 is tangentially fit the arc surface of the slot, and the radius R of the arc surface of the slot 27 is greater than the radius of the stop stub 26. The depth H of the slot 27 is greater than the radius of the stop stub 26.

Figure 9:
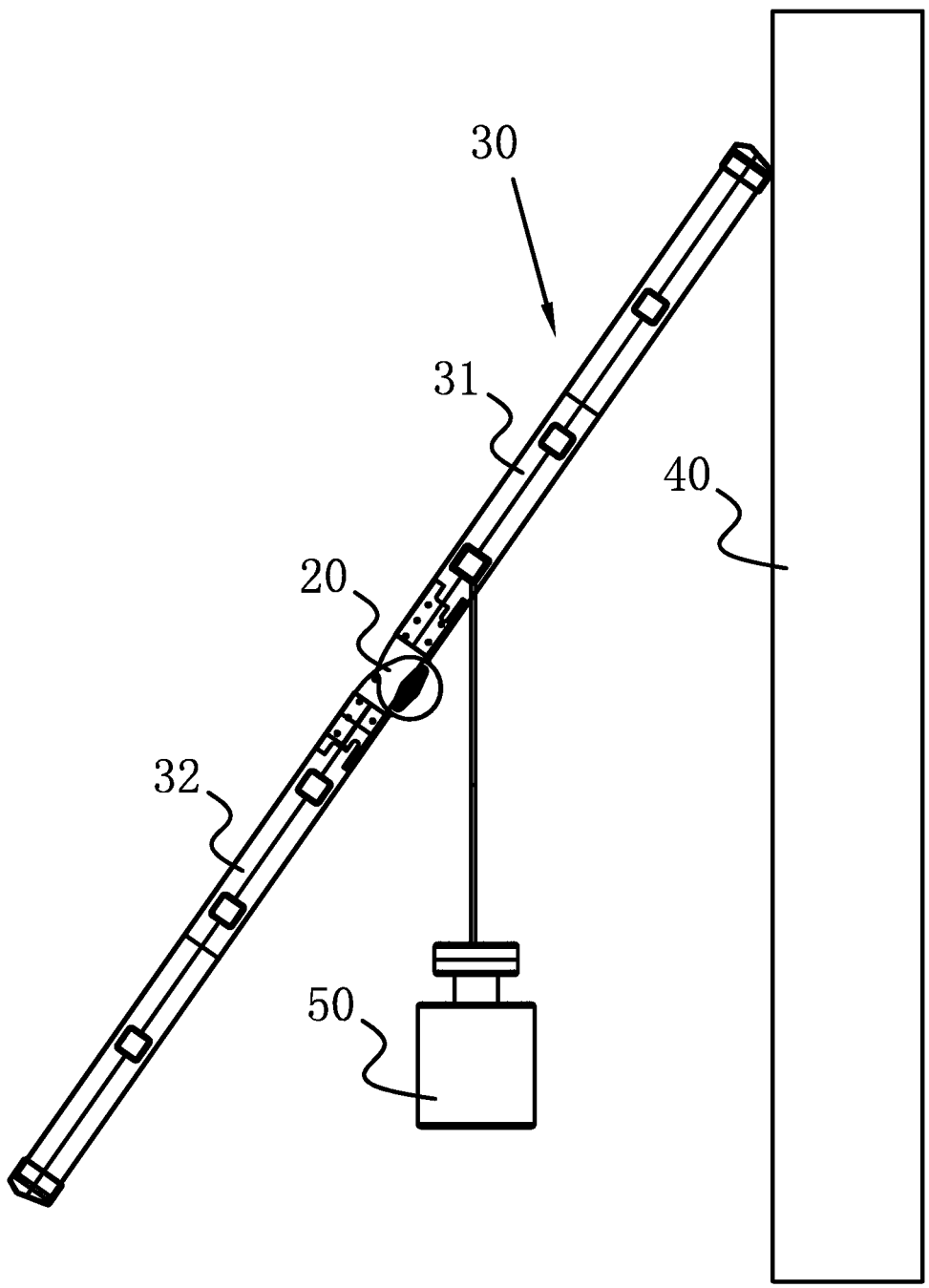
FIG. 9 is a schematic diagram of a ladder mounted with the thick-plate hinge for ladder jointing provided in the present invention in performance test, with the thick-plate hinge unfolded to 180°.

Please see FIG. 9. Two thick-plate hinges 20 can be connected between an upper ladder section 31 and a lower ladder section 32, so that the ladder can be transformed into a double-sided ladder (with 36° unfolding angle) or a long straight ladder (with 180° unfolding angle), to attain multiple purposes. When a ladder 30 mounted with the thick-plate hinges 20 provided in the present invention is unfolded to 180° and tested in 'single joint lock test', the ladder is obliquely supported on a vertical wall 40 at a certain angle, and then one thick-plate hinge 20 is manipulated to fail state (the lock pin 25 is drawn out of the lock hole); in that case, the function of the failed hinge is still able to assist the another thick-plate hinge effectively to bear the heavy load 50 hung on the upper section 31 of the tested ladder, since the stop stub 26 of the failed hinge enters into the slot 27.

Compared to the prior art, the ladder 30 that employs the thick-plate hinge 20 provided in the present invention will not be unfolded to an angle greater than 180°; therefore, the ladder has greatly improved bearing performance, and is safer and more reliable.

The above embodiments are provided only to elaborate the technical idea and features of the present invention so that those skilled in the art can understand the present invention and implement accordingly, instead of constituting any limitation to the scope of protection of the present invention. Any equivalent modification or embellishment made on the basis of the substantial spirit of the present spirit shall be deemed as falling into the scope of protection of the present invention.

The invention claimed is:

1. A ladder, comprising:
   a first ladder section;
   a second ladder section; and
   a hinge connected between the first ladder section and the second ladder section, the hinge comprising:
   an inner plate comprising a step shape slot, wherein the step shape slot has an inwardly concaved arc surface, wherein the concaved arc surface has a radius and a centerpoint of the concaved arc surface, and wherein the step shape slot has a depth;
   a pair of outer plates rotatably connected to the inner plate, the pair of outer plates comprising a stop stub having an outer circumferential surface, the stop stub is operably co-operated with the step shape slot of the inner plate to limit relative rotation between the inner plate and the pair of outer plates, wherein a radius of the stop stub is less than both the radius of the concaved arc surface of the step shape slot and the depth of the step shape slot;
   a positioning shaft sleeve in communication with the inner plate and the pair of outer plates, wherein the positioning shaft sleeve comprises a locking pin that is configured to lock the ladder in a straight ladder position such that a relative angle between the first ladder section and the second ladder section is 180°;
   wherein, when the lock pin has a failure that prevents the lock pin from locking the ladder in the straight ladder position, the stop stub of the outer plates engages the centerpoint of the concaved arc surface of the step shape slot of the inner plate, wherein the outer circumferential surface of the stop stub is tangentially fit to the arc surface of the step shape slot to maintain the ladder in the straight ladder position.

2. The ladder according to claim 1, wherein the stop stub of the outer plates is a column stub.

3. The ladder according to claim 1, wherein the stop stub of the outer plates is a cylindrical stub.

4. The ladder according to claim 1, wherein the locking pin of the positioning shaft sleeve is configured to lock the ladder in a double-sided ladder position such that a relative angle between the first ladder section and the second ladder section is 36°.

5. The ladder according to claim 1, wherein the locking pin of the positioning shaft sleeve is configured to lock the ladder in a folded ladder position such that a relative angle between the first ladder section and the second ladder section is 0°.

6. The ladder according to claim 1, wherein the stop stub is disposed between the outer plates.

7. A ladder, comprising:
   a first ladder section;
   a second ladder section; and
   a hinge connected between the first ladder section and the second ladder section, the hinge comprising:
   a first plate comprising a stop stub having an outer circumferential surface;
   a second plate rotatably connected to the first plate, wherein the second plate comprises a step shape slot having an inwardly concaved arc surface configured to receive the stop stub, and wherein a depth of the step shape slot is greater than or equal to a radius of the stop stub of the first plate;
   a positioning shaft sleeve in communication with the first plate and the second plate, wherein the positioning shaft sleeve comprises a locking pin that is configured to lock the ladder in a straight ladder position such that a relative angle between the first ladder section and the second ladder section is 180°;

wherein, when the lock pin has a failure that prevents the lock pin from locking the ladder in the straight ladder position, the stop stub of the first plate engages a centerpoint of the depth of the step shape slot of the second plate, wherein the outer circumferential surface of the stop stub is tangentially fit to the arc surface of the step shape slot to maintain the ladder in the straight ladder position.

8. The ladder according to claim 7, wherein the stop stub of the first plate is a column stub, and wherein the step shape slot of the second plate is an inwardly slot.

9. The ladder according to claim 7, wherein the stop stub of the first plate is a cylindrical stub, and wherein the step shape slot comprises an inwardly concaved arc surface.

10. The ladder according to claim 9, wherein a radius of the inwardly concaved arc surface is greater than the radius of the stop stub.

11. The ladder according to claim 7, wherein the locking pin of the positioning shaft sleeve is configured to lock the ladder in a double-sided ladder position such that a relative angle between the first ladder section and the second ladder section is 36°.

12. The ladder according to claim 7, wherein the locking pin of the positioning shaft sleeve is configured to lock the ladder in a folded ladder position such that a relative angle between the first ladder section and the second ladder section is 0°.

13. A ladder, comprising:
a first ladder section;
a second ladder section; and
a hinge connected between the first ladder section and the second ladder section, the hinge comprising:
　a first plate comprising a stop stub having an outer circumferential surface;
　a second plate rotatably connected to the first plate, wherein the second plate comprises a step shape slot configured to receive the stop stub, wherein the step shape slot comprises an arc surface having a center point, wherein the radius of the arc surface is greater than or equal to a radius of the stop stub of the first plate;
wherein the step shape slot is configured to receive the stop stub at the center point of the arc surface;
　a positioning shaft sleeve in communication with the first plate and the second plate, wherein the positioning shaft sleeve comprises a locking pin that is configured to lock the ladder in a straight ladder position such that a relative angle between the first ladder section and the second ladder section is 180°;
wherein, when the lock pin has a failure that prevents the lock pin from locking the ladder in the straight ladder position, the stop stub of the first plate engages the arc surface of the step shape slot of the second plate, wherein the outer circumferential surface of the stop stub is tangentially fit to the arc surface of the step shape slot to maintain the ladder in the straight ladder position.

14. The ladder according to claim 13, wherein the stop stub of the first plate is a column stub, and wherein the step shape slot of the second plate is an inwardly slot.

15. The ladder according to claim 13, wherein the stop stub of the first plate is a cylindrical stub, and wherein the arc surface of the step shape slot of the second plate is an inwardly concaved arc surface.

16. The ladder according to claim 13, wherein a depth of the step shape slot of the second plate is greater than the radius of the stop stub of the first plate.

17. The ladder according to claim 13, wherein the locking pin of the positioning shaft sleeve is configured to lock the ladder in a double-sided ladder position such that a relative angle between the first ladder section and the second ladder section is 36°.

18. The ladder according to claim 13, wherein the locking pin of the positioning shaft sleeve is configured to lock the ladder in a folded ladder position such that a relative angle between the first ladder section and the second ladder section is 0°.

* * * * *